US008423658B2

(12) United States Patent
Shatsky (10) Patent No.: US 8,423,658 B2
(45) Date of Patent: Apr. 16, 2013

(54) METHOD AND SYSTEM TO RELEASE INTERNET PROTOCOL (IP) MULTIMEDIA SUBSYSTEM (IMS), SESSION INITIATION PROTOCOL (SIP), IP-CONNECTIVITY ACCESS NETWORK (IP-CAN) AND RADIO ACCESS NETWORK (RAN) NETWORKING RESOURCES WHEN IP TELEVISION (IPTV) SESSION IS PAUSED

(75) Inventor: Alexander Shatsky, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 337 days.

(21) Appl. No.: 12/813,189

(22) Filed: Jun. 10, 2010

(65) Prior Publication Data

US 2011/0307624 A1    Dec. 15, 2011

(51) Int. Cl.
*G06F 15/173*    (2006.01)
(52) U.S. Cl.
USPC .......................................... 709/231; 709/227
(58) Field of Classification Search .................. 709/231, 709/227
See application file for complete search history.

(56) References Cited

U.S. PATENT DOCUMENTS

| 6,457,049 | B2 * | 9/2002 | Lewis et al. .................. 709/223 |
| 6,788,676 | B2 | 9/2004 | Partanen et al. |
| 8,060,608 | B2 * | 11/2011 | Wang et al. .................. 709/224 |
| 8,234,387 | B2 * | 7/2012 | Bradley et al. ................ 709/229 |
| 8,316,082 | B2 * | 11/2012 | Igarashi ........................ 709/203 |
| 2004/0128342 | A1 * | 7/2004 | Maes et al. .................... 709/200 |
| 2009/0089846 | A1 * | 4/2009 | Wang et al. ..................... 725/98 |
| 2009/0228939 | A1 * | 9/2009 | Qi et al. ......................... 725/93 |
| 2009/0245256 | A1 * | 10/2009 | Yan et al. ...................... 370/390 |
| 2010/0085959 | A1 * | 4/2010 | Vohra et al. ................... 370/352 |
| 2010/0107205 | A1 * | 4/2010 | Foti ............................... 725/109 |
| 2011/0083153 | A1 * | 4/2011 | Cedervall et al. ............... 725/88 |
| 2011/0219416 | A1 * | 9/2011 | Lindquist et al. ............. 725/110 |

FOREIGN PATENT DOCUMENTS

WO    WO 2010112591 A1 * 10/2010

OTHER PUBLICATIONS

Riede, Christan et al., "Session and Media Signaling for IPTV via IMS", 2008, Mobileware '08: proceedings of the 1st internation conference on Mobile wireless MiddleWare, operating systes, and application, ICST, Innsbruck, Austria, pp. 1-6.*
Cruz, Rui A Santos et al. "IPTV Architecture for an IMS Environment with Dynamic QoS Adaption", May 27, 2010, Multimed Tools Appl. (2011) 53:557-589.*
Arnaud, Julien et al. "Adapted IPTV Service within Novel IMS Architecture", 2009 Mobimedia '09, Sep. 7-9, London UK pp. 1-5.*

(Continued)

*Primary Examiner* — Kevin Bates
(74) *Attorney, Agent, or Firm* — Conley Rose, P.C.; J. Robert Brown, Jr.

(57) ABSTRACT

A user equipment (UE), comprising at least one component configured to support controlling a media stream and modifying Internet Protocol-Connectivity Access Network (IP-CAN)/Radio Access Network (RAN) and Internet Packet (IP) Multimedia Subsystem (IMS) media resources, wherein the IP-CAN/RAN and IMS media resources are modified using a Session Initiation Protocol (SIP) RE-INVITE request to an IMS network, and wherein the media stream is controlled using a Real Time Streaming Protocol (RTSP) request to a media server. Also included is a UE comprising at least one component configured to support a method comprising sending a RTSP request to a signaling/control server in communications with a media server to control a media stream, wherein a SIP RE-INVITE request associated with the RTSP request is further sent from the UE or the signaling/control server to an IMS network to modify media resources associated with the media stream.

13 Claims, 7 Drawing Sheets

OTHER PUBLICATIONS

PCT International Search Report; Application No. PCT/CA2011/050353; Sep. 14, 2011; 3 pages.

PCT Written Opinion of the International Searching Authority; Application No. PCT/CA2011/050353; Sep. 14, 2011; 3 pages.

Sivasothy, Shanmugalingam, et al.; "A Unified Session Control Protocol for IPTV Services;" ICACT 2009; Feb. 15-18, 2009; 5 pages.

3GPP TS 23.203 v9.4.0; 3rd Generation Partnership Project; Technical Specification Group Services and System Aspects; Policy and Charging Control Architecture; Release 9; Mar. 2010; 123 pgs.

3GPP TS 23.228 v10.0.0; 3rd Generation Partnership Project; Technical Specification Group Services and System Aspects; IP Multimedia Subsystem (IMS); Stage 2; Release 10; Mar. 2010; 267 pgs.

3GPP TS 24.228 v5.15.0; 3rd Generation Partnership Project; Technical Specification Group Core Network and Terminals; Signalling Flows for the IP Multimedia Call Control Based on Session Initiation Protocol (SIP) and Session Description Protocol (SDP); Stage 3; Release 5; Sep. 2006; 851 pgs.

3GPP TS 26.234 v9.2.0; 3rd Generation Partnership Project; Technical Specification Group Services and System Aspects; Transparent End-to-End Packet-Switched Streaming Service (PSS); Protocols and Codecs; Release 9; Mar. 2010; 176 pgs.

3GPP TS 26.237 v9.2.0; 3rd Generation Partnership Project; Technical Specification Group Services and System Aspects; IP Multimedia Subsystem (IMS) Based Packet Switch Streaming (PSS) and Multimedia Broadcast/Multicast Service (MBMS) User Service; Protocols; Release 9; Mar. 2010; 96 pgs.

3GPP TS 29.162 v9.4.0; 3rd Generation Partnership Project; Technical Specification Group Core Network and Terminals; Interworking Between the IM CN Subsystem and IP Networks; Release 9; Mar. 2010; 43 pgs.

3GPP TS 29.213 v8.6.0; 3rd Generation Partnership Project; Technical Specification Group Core Network and Terminals; Policy and Charging Control Signalling Flows and QoS Parameter Mapping; Release 8; Dec. 2009; 122 pgs.

3GPP TS 29.214 v9.3.0; 3rd Generation Partnership Project; Technical Specification Group Core Network and Terminals; Policy and Charging Control over Rx Reference Point; Release 9; Mar. 2010; 45 pgs.

3GPP TS 29.235 v9.4.0; 3rd Generation Partnership Project; Technical Specification Group Core Network and Terminals; Interworking Between SIP-I Based Circuit-Switched Core Network and Other Networks; Release 9; Mar. 2010; 100 pgs.

Schulzrinne, H., et al.; Title: "Real Time Streaming Protocol (RTSP);" IETF RFC 2326; Network Working Group; Standards Track; Apr. 1998; 77 pgs.

Rosenberg, J., et al.; Title: "SIP: Session Initiation Protocol;" IETF RFC 3261; Network Working Group; Standards Track; Jun. 2002; 225 pgs.

Rosenberg, J., et al.; Title: "An Offer/Answer Model with the Session Description Protocol (SDP);" IETF RFC 3264; Network Working Group; Standards Track; Jun. 2002; 21 pgs.

Calhoun, P., et al.; Title: "Diameter Base Protocol;" IETF RFC 3588; Network Working Group; Standards Track; Sep. 2003; 123 pgs.

Handley, M., et al.; Title: "SDP: Session Description Protocol;" IETF RFC 4566; Network Working Group; Standards Track; Jul. 2006; 41 pgs.

\* cited by examiner

METHOD AND SYSTEM TO RELEASE INTERNET PROTOCOL (IP) MULTIMEDIA SUBSYSTEM (IMS), SESSION INITIATION PROTOCOL (SIP), IP-CONNECTIVITY ACCESS NETWORK (IP-CAN) AND RADIO ACCESS NETWORK (RAN) NETWORKING RESOURCES WHEN IP TELEVISION (IPTV) SESSION IS PAUSED

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) and LTE-Advanced (LTE-A). For example, an LTE or LTE-A system might include an Evolved Universal Terrestrial Radio Access Network (E-UTRAN) node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

The signals that carry data between UEs and access nodes can have frequency, time, and coding parameters and other characteristics that might be specified by a network node. A connection between any of these elements that has a specific set of such characteristics can be referred to as a resource. A connection may be established by shared channels, such as in the case of an E-UTRAN, or by one or more radio links, such as in the case of a Universal Terrestrial Radio Access Network (UTRAN). A network node typically establishes a different resource for each UE or other network nodes with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Currently, standard protocols are being developed for a new generation of Television (TV) services, referred to as IP Television (IPTV), by different standard development organizations, including the Third Generation Partnership Project (3GPP) and The European Telecommunications Standards Institute (ETSI) Telecoms & Internet converged Services & Protocols for Advanced Networks (TISPAN) working group. IPTV is a system where a digital television service may be delivered using IP over a network infrastructure, such as a broadband connection. As such, IPTV comprises television content that may be received by a viewer using computer network technologies instead of traditional broadcast or cable technologies.

In one development, the 3GPP specification TS26.234 for delivering streaming services over the Internet has been extended in TS26.237 to support the delivery of IPTV services or other streaming services over IMS networks. The IMS was originally designed by the 3GPP as part of efforts to evolve mobile networks beyond global system for mobile communications (GSM). The IMS comprises an architectural framework for delivering IP multimedia to mobile users. In an original release (3GPP R5), the IMS presented an approach to deliver Internet services over General packet radio service (GPRS) and other IP-CAN systems, e.g. Evolved Packet Core (EPC). Subsequently, the IMS was updated by 3GPP, 3GPP version two (3GPP2), and TISPAN to support networks in addition to GPRS networks, such as Wireless Local Area Networks (WLANs), Code Division Multiple Access 2000

(CDMA2000) networks, Third Generation (3G) networks, LTE networks, and fixed line networks. Session initiation protocol (SIP) is a signaling protocol that is leveraged by IMS to establish connectivity between the IMS network components. SIP is a text-based signaling protocol that may be used to communicate between a UE and the IMS core network, the IMS core network and application servers, components of the IMS network, or combinations thereof. The SIP is specified in RFC 3261.

In IMS networks, an IMS network server, e.g. a Proxy-Call Session Control Function (P-CSCF), may allocate IP-CAN/RAN resources based on information in a Session Description Protocol (SDP) communication, e.g. as described in Internet Engineering Task Force (IETF) Request for Comments (RFC) 4566. The SDP information may describe the media capabilities of the UE and Packet Switch Streaming (PSS), Multimedia Broadcast/Multicast Service (MBMS), and/or IPTV media servers. The media capabilities may comprise bandwidth, codec types, codec rates, directions of the media streams, other media capability attributes, or combinations thereof. In some embodiments, an IMS network server, such as IMS Interconnection Border Control Function (IBCF) or an IMS-Application Level Gateway (IMS-ALG), may allocate Transition Gateway (TrGW) resources based on SDP information.

In TS 26.237, SIP signaling is used to discover and negotiate PSS and/or MBMS capabilities, register the UE with the IMS network; subscribe the UE with IMS application server, and set up, modify and teardown a session between a UE and PSS and/or MBMS application servers. However, SIP does not support some of the functionalities of PSS/MBMS/IPTV for streaming or IPTV services, for instance such as a request to RECORD IPTV sessions. Instead, a Real Time Streaming Protocol (RTSP) is used to control playback operations for streaming of IPTV services, e.g. as described in TS26.237. The RTSP is specified in RFC 2326. The playback operations may comprise PLAY, PAUSE, TEARDOWN, REDIRECT, RECORD and other commands.

For instance, when a PSS, MBMS, or IPTV session is paused using RTSP, the RTSP PAUSE request may be directly sent by the UE to an Application Server (AS), e.g. PSS Adapter, a Session Control Function (SCF), or an IPTV call control server, which may halt the media session by instructing a PSS Server, a Broadcast Multicast-Service Center User Plane Function (BM-SC.UPF) server, or a media server to stop sending the media stream. The PSS Adapter, SCF, and IPTV call control server may be Application Servers of the IMS Network 160. The PSS Adapter is a back-to-back user agent (B2BUA) that handles two signaling call legs for the same IPTV session with the UE. The first signaling call leg uses SIP as a signaling protocol, and the second call leg uses RTSP as a signaling protocol. The IMS network, IP-CAN, and RAN resources are allocated by means of the SIP signaling call leg, while any playback commands (including RTSP PAUSE request) are transmitted over the RTSP call leg.

The IMS and IP-CAN/RAN networks may not be aware of the PAUSE request that is sent to the PSS/MBMS/IPTV server, and therefore IMS and IP-CAN/RAN resources that were initially allocated for the media stream may not be properly reconfigured. This situation may result in excessive usage of the IP-CAN/RAN and IMS media resources when the resources remain active (or allocated) for the paused (or inactive) PSS, MBMS, or IPTV video, audio, or text stream.

Further, the session established with the IMS and IP-CAN/RAN networks to support IPTV services may be terminated if the IMS and IP-CAN/RAN networks are not aware of the RTSP PAUSE request. A Policy and Changing Rules Function (PCRF) of the Policy and Charging Control (PCC), such as defined in TS23.203, may be notified by a Policy and Charging Enforcement Function (PCEF) when the bit rate on a downlink or uplink for an IP Connectivity Access Network (IP-CAN) bearer drops to about zero kilobits per second (kbit/s), as described in TS23.228. Similarly, the PCEF may notify the PCRF when the bit rate on the downlink or uplink increases beyond an authorized limit. Subsequently, the notification may be forwarded to the P-CSCF to initiate a session release towards the remote end point (e.g. the UE) associated with the corresponding link. For instance, when a media stream is paused on a link by the PSS server, a RAN that may monitor status of resources may send a notice to the PCEF upon detecting that the bit rate on the link has reached about zero kbit/s. The PCEF, in turn, may notify the PCRF, which may forward the notification to the P-CSCF. Thus, the P-CSCF may release the SIP session associated with the paused media stream.

The session associated with the paused media stream may also be released by an IBCF that is described in TS 23.228. According to TS29.162 and TS29.235, when a Circuit Switch-IBCF (CS-IBCF) requests a Circuit Switched-TrGW (CS-TrGW) to reserve transport addresses/resources, the CS-IBCF may indicate to the CS-TrGW that detection of an inactive media flow is required and may also specify an inactivity detection time and an inactivity detection direction. The IBCF may request the detection of media inactivity on a termination or a stream basis. The CS-TrGW may determine a media flow to be inactive if media is not sent and/or received within the inactivity detection time period. When the CS-IBCF receives a notification of inactive media from the CS-TrGW, e.g. via a Media Inactivity Notification procedure, the CS-IBCF may return a Media Inactivity Notification Acknowledgement and take appropriate action, i.e. terminate the SIP session associated with the paused media stream.

Disclosed herein are methods, devices, and systems for configuring IMS and IP-CAN/RAN resources when a PSS/MBMS/IPTV session is stopped, paused, and/or resumed. The IMS and IP-CAN/RAN resources are configured to prevent the release of the PSS/MBMS/IPTV session, such as in the cases described above. The IMS and IP-CAN/RAN resources may be reconfigured when the PSS/MBMS/IPTV session is paused or stopped and may be reallocated when the session is resumed.

Figure 1:
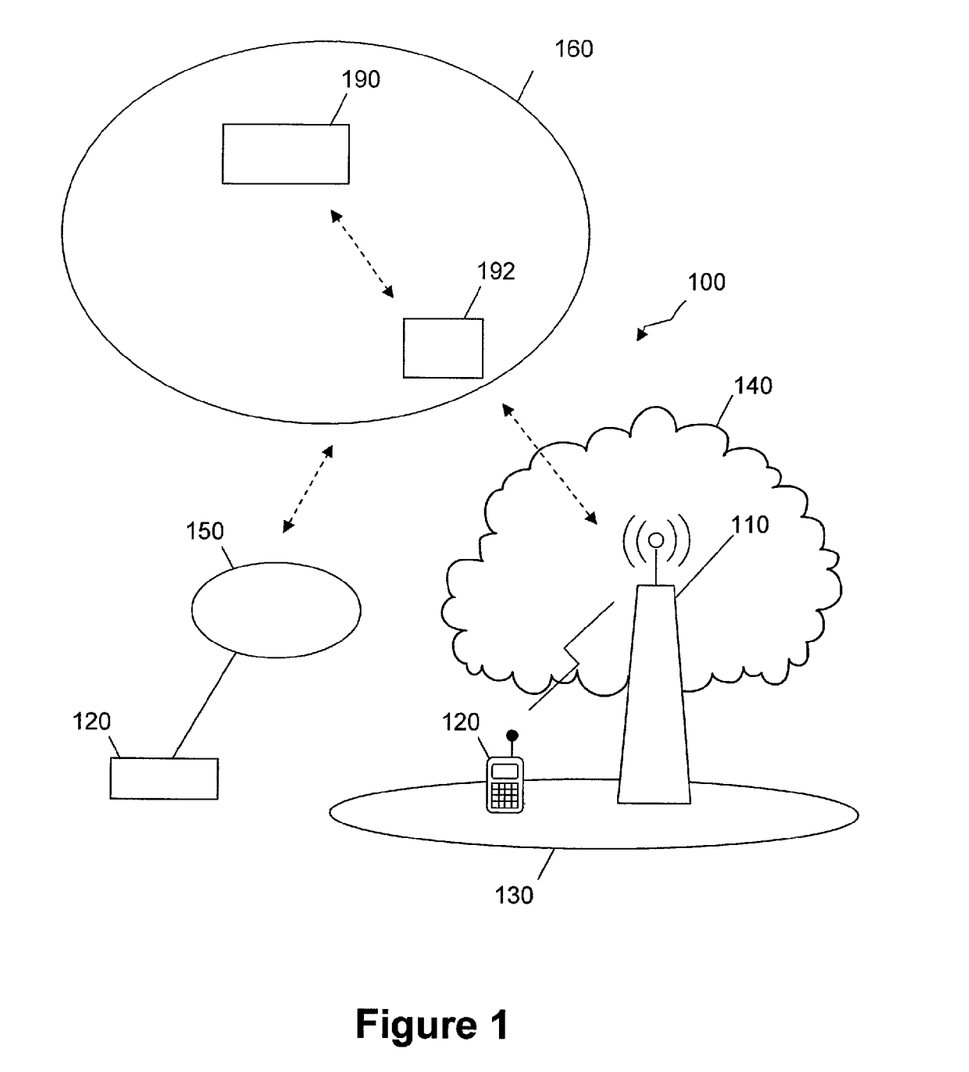
FIG. 1 is a schematic diagram of a communications system that provides a media stream to a user.

FIG. 1 illustrates an embodiment of a communications system 100 that provides a media stream to a user. The media stream may be provided such as in a RAN, by allocating IP-CAN/RAN resources to the media stream. FIG. 1 is exemplary and may have other components or arrangements in other embodiments. In an embodiment, the communications system 100 may comprise at least one access device 110 and at least one UE 120. The communications system 100 may comprise an IP-CAN/RAN 140 that communicates with the UE 120 via the access device 110. For example, the communications system 100 may comprise a LTE or LTE-A network as described in 3GPP. The communications system 100 may also comprise an IMS network 160, which may include a media server 190 and a signaling/control server 192, e.g. at a provider network.

The access devices 110 may be an eNB, a base station, or other components that promote network access for the UEs 120. The access device 110 may communicate with any UE 120, which may be within the same cell 130, directly via a direct link, such as in a UTRAN. The cell 130 may be a geographical area of reception and transmission coverage. For instance, the direct link may be a point-to-point link established between the access device 110 and the UE 120 and used to transmit and receive signals between the two. Alternatively, the access devices 110 may communicate with any UE 120 in the same cell 130 over shared links, e.g. as an uplink shared channel and a downlink shared channel, such as in an E-UTRAN.

The UE 120 may receive IPTV and/or PSS/MBMS media streams from the media server 190 after a signaling connection is established through the signaling/control server 192, for instance via a link with the access device 110. The media server 190 may be a PSS Server, and IPTV media server, or a BM-SC.UPF server which may be located in the provider network. The signaling/control server 192 may comprise a PSS adapter, a SCF, or an IPTV call control server and may be configured to control signaling, manage requests, and/or control media streams of the media server 190. As such, the UE 120 may receive a media stream from the media server 190 over the IP-CAN/RAN 140, which may be associated and in communication with an IMS network. The media resources may be allocated by IP-CAN/RAN and IMS network resources. Similarly, the UE 120 may send a media stream to the media server 190 over the IP-CAN/RAN 140, via the access device 110 and through IMS network 160. The media stream may correspond to a PSS/MBMS/IPTV session.

In an embodiment, the communications system 100 may comprise a fixed UE 120, such as an IPTV terminal or a set-top box, which may be coupled to an access router and/or access network 150 via a fixed link, e.g. an optical or electrical cable. The fixed UE 120 may communicate with the media server 190 and the signaling/control server 192 via the access router/access 150. As such, the fixed UE 120 may receive a media stream from the media server 190 over the IMS network 160. The fixed UE 120 may also send a media stream to the media server 190 over the IMS network 160, via the access router/access network 150.

The UE 120 may also use RTSP to control playback operations for the IPTV or streaming services, such PLAY, STOP, PAUSE, and other commands/requests. For example, when a user wishes to put a streaming PSS/MBMS/IPTV session on hold or pause it, the UE 120 may send a RTSP PAUSE request to the signaling/control server 192, which may forward the request to the media server 190. The media server 190 may then stop or pause the streaming session. The request may be sent from the UE 120 to the signaling/call control server 192 through the IMS network 160 or a non-IMS network (e.g. Internet).

Since the RTSP is not be supported by the IMS network as a signaling protocol, the IMS network may not be aware of the content and state of the RTSP and therefore may not be aware of the RTSP PAUSE request and the intent of the user to put the streaming PSS/MBMS/IPTV session on hold or pause it. As a result, the IP-CAN/RAN and IMS resources associated with the streaming session may remain unnecessarily allocated or reserved. Additionally, the IP-CAN/RAN 140 and IMS network may release the session, e.g. by terminating the link with the UE 120, after detecting that the bit rate on the link has reached about zero kbit/s.

In an embodiment, to avoid the unnecessary allocation of resources during the session's suspended time and/or dropping the session, the UE 120 may be configured to send a SIP request to the IP-CAN/RAN 140 and the IMS network 160 to indicate an inactive media stream. Alternatively, the signaling/call control server 192, e.g. the PSS adapter or IPTV call control server, may send the SIP request to the IP-CAN/RAN 140 to indicate the inactive media stream. Upon receiving the SIP request, the IP-CAN/RAN 140 and the IMS network 160 may reconfigure the resources, e.g. until the media streaming is resumed. The IP-CAN/RAN and IMS resources may be reconfigured during the session paused time using any of the methods described below or others that will readily suggest themselves in view of the present disclosure.

Figure 2:
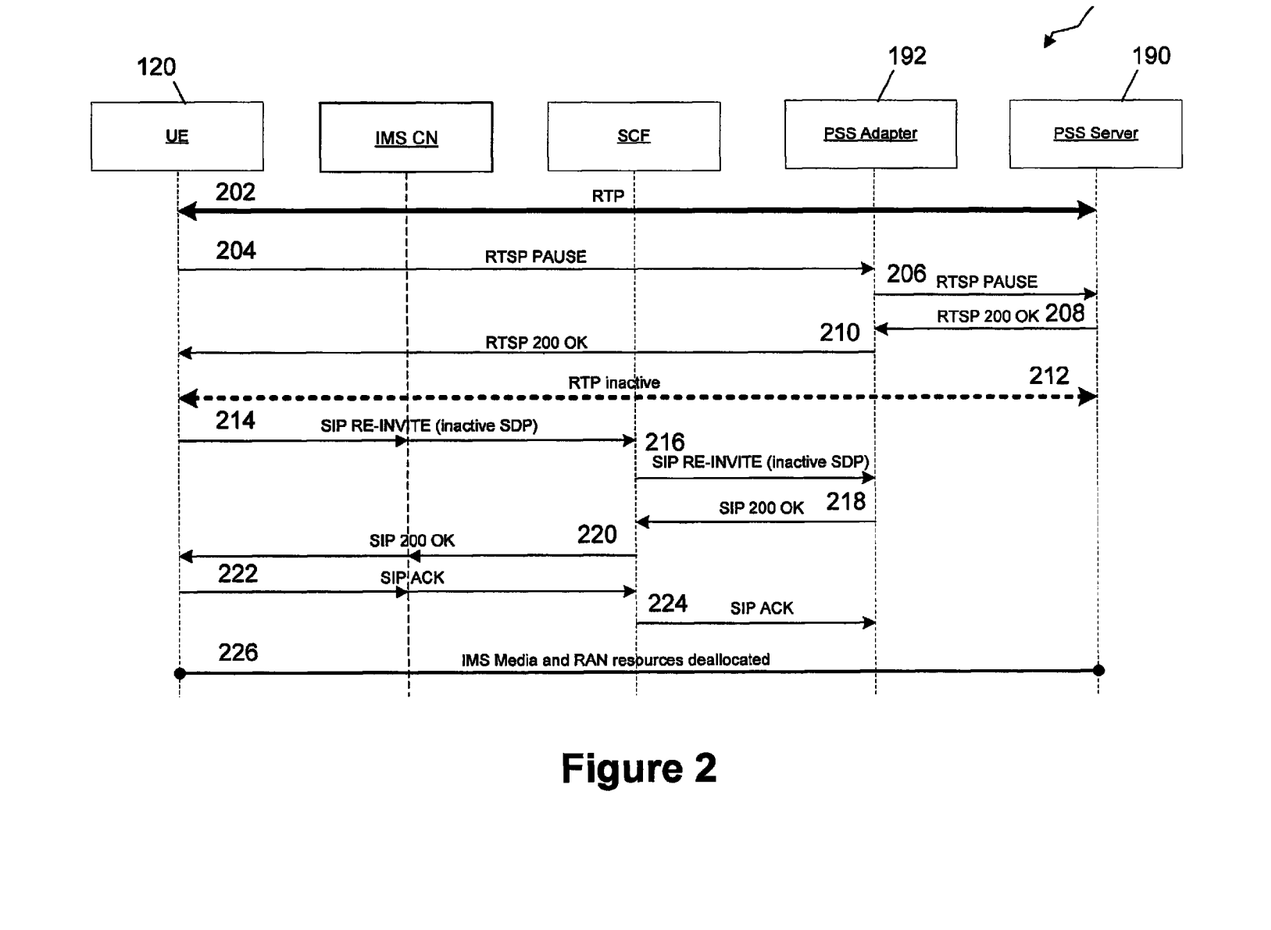
FIG. 2 is a protocol diagram of a method for pausing a media stream and modifying RAN, IP-Connectivity Access Network (IP-CAN) and Internet Packet (IP) Multimedia Subsystem (IMS) resources according to an embodiment of the disclosure.

FIG. 2 illustrates an embodiment of a method 200 for pausing a media stream and modifying IP-CAN/RAN and IMS resources, which may save network resources and prevent terminating the media stream session. According to the method 200, the UE 120 may send a SIP RE-INVITE request to the IMS network 160 to de-allocate the IP-CAN/RAN and IMS media resources. In other embodiments, the UE 120 may send SIP target refresh requests, such as a SIP UPDATE request, other than the SIP RE-INVITE request. A target refresh request is defined in RFC 3261 as a request sent within a dialog that can modify the remote target of the dialog. In an embodiment, an IMS Core Network (IMS CN) or subsystem may route or relay SIP messages between the UE and the remaining components. At step 202, the UE 120 may receive a media stream that corresponds to a PSS/MBMS/IPTV media session with the media server 190, e.g. a PSS server (or IPTV media server). The PSS/MBMS/IPTV media session may have established the media stream using a Real-time Transport Protocol (RTP) or other media transport protocols. At step 204, the UE 120 may send a RTSP PAUSE request to a PSS adapter, which may forward the request to the PSS server at step 206. The PSS server may then suspend or stop the media stream and send a confirmation, e.g. RTSP 200 OK message, to the PSS adapter at step 208 to indicate that the request has been successfully processed. At step 210, the PSS adapter may forward the confirmation to the UE 120. At step 212, the RTP established session may become inactive as a result of the PSS server suspending the media stream.

At step 214, the UE 120 may send a SIP RE-INVITE request to a Session Control Function (SCF) of the IMS network 160 associated with the IP-CAN/RAN 140, after receiving the confirmation from the PSS adapter. The SIP RE-INVITE may be sent from the UE 120 to the SCF via the IMS network 160. In some embodiments, the UE 120 may use an application timer to allow a time delay between receiving the confirmation (step 210) and sending the SIP RE-INVITE request. The time delay may be pre-configured on the UE 120 or indicated in the received confirmation, e.g. the RTSP 200 OK message. The SIP RE-INVITE request may comprise SDP information that indicates an inactive session. The SDP information or SDP body may comprise a plurality of media components that the UE 120 requests to pause or suspend. The SDP body may comprise previously agreed SDP capabilities, e.g. prior to suspending the media stream, and an SDP attribute, "a", that indicates the inactive session.

For example, the SDP body may include:

```
v=0
o=carol 28908764872 28908764872 IN IP4 10.10.100.101
s=-
t=0 0
c=IN IP4 10.10.100.101
a=inactive
m=audio 49724 RTP/AVP 0 1 3
a=rtpmap:0 PCMU/8000
a=rtpmap:1 1016/8000
a=rtpmap:3 GSM/8000
m=video 49726 RTP/AVP 31 34
a=rtpmap:31 H261/90000
a=rtpmap:34 H263/90000
```

The "a" attribute and an "inactive" (or "sendonly") value may be included in the session-levels (e.g. before the "m" attributes) in the SDP body, and may indicate that the UE 120 requests to pause all media streams of the corresponding session. Alternatively, the "a" attribute and "inactive" value may be included in a media-level specified by an SDP media descriptor.

Upon receiving the SIP RE-INVITE request at the P-CSCF, the IMS network 160 may contact the IP-CAN/RAN 140, e.g. as described in TS29.213, and indicate that the resources previously allocated for the media stream may be reconfigured according to the amount of traffic in the corresponding session. According to section 6.2 of the TS29.213, when a session is initiated or modified, the P-CSCF may use mapping rules in Table 6.2.1 for each SDP media component to derive a Media-Component-Description Attribute-Value Pair (AVP) from the SDP parameters. The table may comprise a Flow-Status entry:

```
Flow-      IF port in m-line = 0 THEN
Status         Flow-Status:= REMOVED;
           ELSE
            IF Transport in m-line is "TCP" or " TCP/MSRP"
            THEN (NOTE 9)
              Flow-Status := ENABLED;
            ELSE /* UDP or RTP/AVP transport
            IF a=recvonly THEN
              IF <SDP direction> = UE originated (NOTE 8) THEN
                 Flow-Status := ENABLED_DOWNLINK; (NOTE 4)
              ELSE /* UE terminated (NOTE 8) */
                 Flow-Status := ENABLED_UPLINK; (NOTE 4)
              ENDIF;
            ELSE
            IF a=sendonly THEN
              IF <SDP direction> = UE originated (NOTE 8) THEN
                 Flow-Status := ENABLED_UPLINK; (NOTE 4)
              ELSE /* UE terminated (NOTE 8) */
                 Flow-Status := ENABLED_DOWNLINK; (NOTE 4)
              ENDIF;
            ELSE
              IF a=inactive THEN
                 Flow-Status :=DISABLED;
              ELSE /* a=sendrecv or no direction attribute */
                 Flow-Status := ENABLED (NOTE 4)
              ENDIF;
              ENDIF;
            ENDIF;
           ENDIF;
           ENDIF;
           (NOTE 5)
```

According to the Flow-Status entry, the inactive "a" attributes sets the Flow-Status parameter of the Media-Component-Description to "DISABLED". The Flow-Status parameter may be transmitted using the DIAMETER protocol, e.g. according to RFC 3588, over a PCC Rx interface to a PCRF, and subsequently over a PCC Gx interface to a PCEF. Thus, the PCEF may disable the service flow according to the Flow-Status of the corresponding PCC rules. For instance, the PCEF may release or disable the IP-bearer resources of the IP-CAN/RAN 140. The IMS media servers may also adjust their media resources accordingly.

At step 216, the SCF may forward the SIP RE-INVITE request received from P-CSCF/IMS CN, including the SDP body, to the PSS adapter. Upon receiving the SIP RE-INVITE request, the PSS adapter may contact the PSS server (or IPTV media server) to indicate that the IMS resources are no longer available for the media stream. At step 218, The PSS adapter may send a SIP 200 OK message to the SCF in response to the SIP RE-INVITE request. The SIP 200 OK message may comprise updated SDP information. A step 220, the SCF may forward the SIP 200 OK message to the UE 120, via the IMS CN. The IMS network components may make any necessary changes to the media resources in the IP-CAN/RAN 140 and IMS network 160 according to the updated SDP information. In return, a SIP acknowledgment (ACK) may be sent from the UE 120 to the SCF (via the IMS CN) at step 222 and subsequently to the PSS adapter at step 224. At step 226, the IMS media and IP-CAN/RAN resources may become de-allocated for the PSS/MBMS/IPTV session, e.g. while the media stream is paused.

Figure 3:
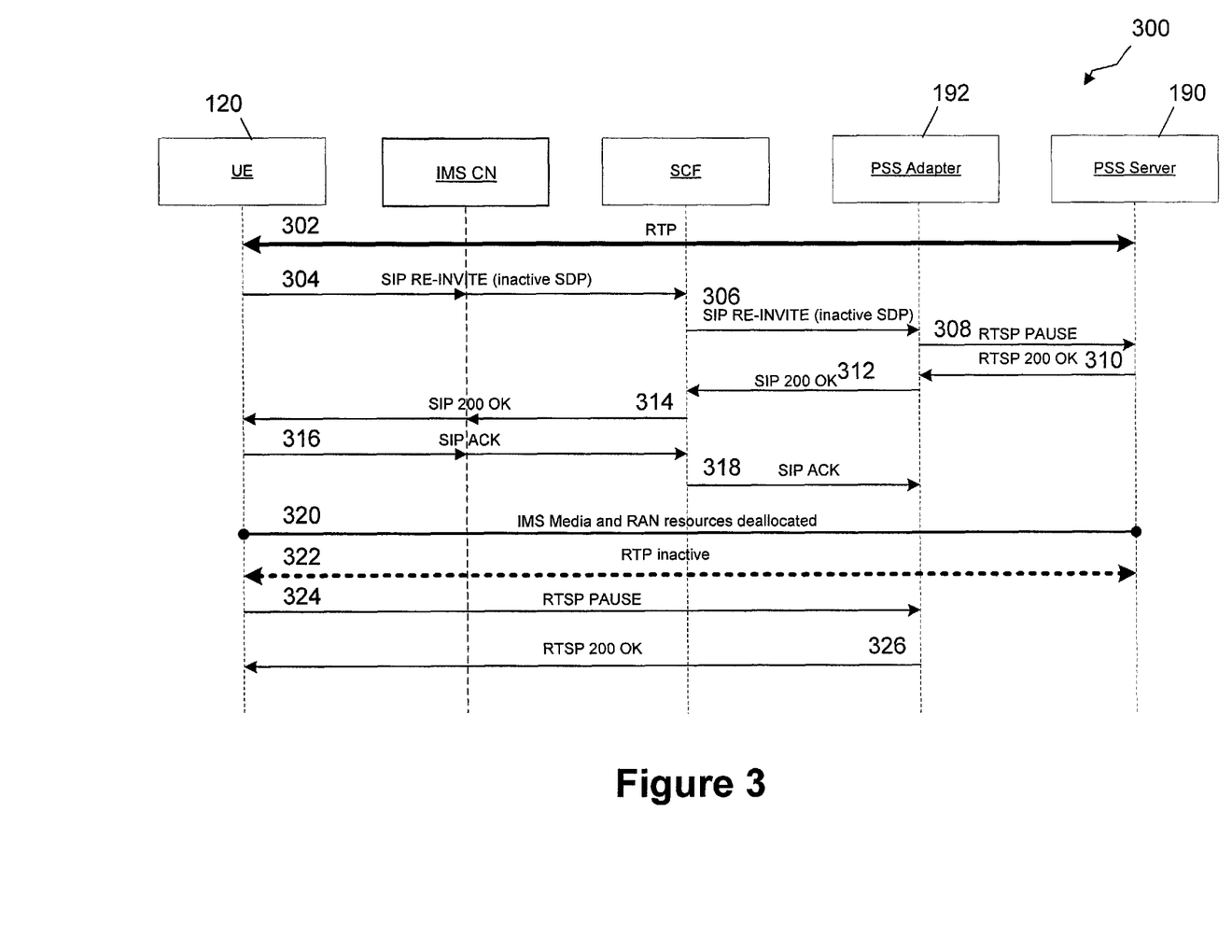
FIG. 3 is a protocol diagram of another method for pausing a media stream and modifying RAN, IP-CAN and IMS resources according to an embodiment of the disclosure.

FIG. 3 illustrates an embodiment of another method 300 for pausing a media stream and modifying IP-CAN/RAN and IMS resources. Similar to the method 200, the UE 120 may send a SIP RE-INVITE request (or other SIP target refresh requests) to the IMS network 160 to suspend the media stream. The SIP RE-INVITE request may comprise the SDP body that indicates an inactive session, as described above. However, the SIP RE-INVITE request may be sent before or at about the same time of sending the RTSP PAUSE request to the signaling/call control server 192. FIG. 3 illustrates the case where the SIP RE-INVITE request may be sent before the RTSP PAUSE request. At step 302, the UE 120 may receive a media stream that corresponds to a PSS/MBMS/IPTV session with a PSS server (the media server 190). The stream may be established using RTP. At step 304, the UE 120 may send a SIP RE-INVITE request to the SCF to stop the media stream and modify the IP-CAN/RAN and IMS media resources. The request may be sent from the UE 120 to the SCF via the IMS CN. The SIP RE-INVITE request may comprise the inactive SDP information. At step 306, the SCF may forward the SIP RE-INVITE request to the PSS adapter.

Upon receiving the SIP RE-INVITE request, based on the inactive SDP content, the PSS adapter may send a RTSP PAUSE request to the PSS server (or IPTV media server) at step 308. The PSS server may then stop the media stream and send a RTSP 200 OK message to the PSS adapter at step 310. At step 312, the PSS adapter may send a SIP 200 OK message to SCF. At step 314, the SCF may forward the SIP 200 OK message to the UE 120, via the IMS CN. In return, the UE 120 may send a SIP ACK to the SCF (via the IMS CN) at step 316 and the SCF may forward the SIP ACK to the PSS adapter at step 318. At step 320, the IMS media and IP-CAN/RAN resources may become de-allocated for the PSS/MBMS/IPTV session, as the media stream is paused. At step 322, the RTP established session may become inactive as a result of the PSS server suspending the media stream. At step 324, the UE 120 may send a RTSP PAUSE request to the PSS adapter. The PSS adapter may verify that the PSS server has stopped the media stream and send a RTSP 200 OK message to the UE 120 at step 326.

In an embodiment, the UE 120 may use an application timer to allow a time delay between receiving the SIP 200 OK message from the SCF network and sending the RTSP PAUSE request to the PSS adapter. In another embodiment, the steps 324 and 326 may be omitted, since the PSS adapter has previously received an indication of the pause request in the form of the SIP RE-INVITE request at step 306.

Figure 4:
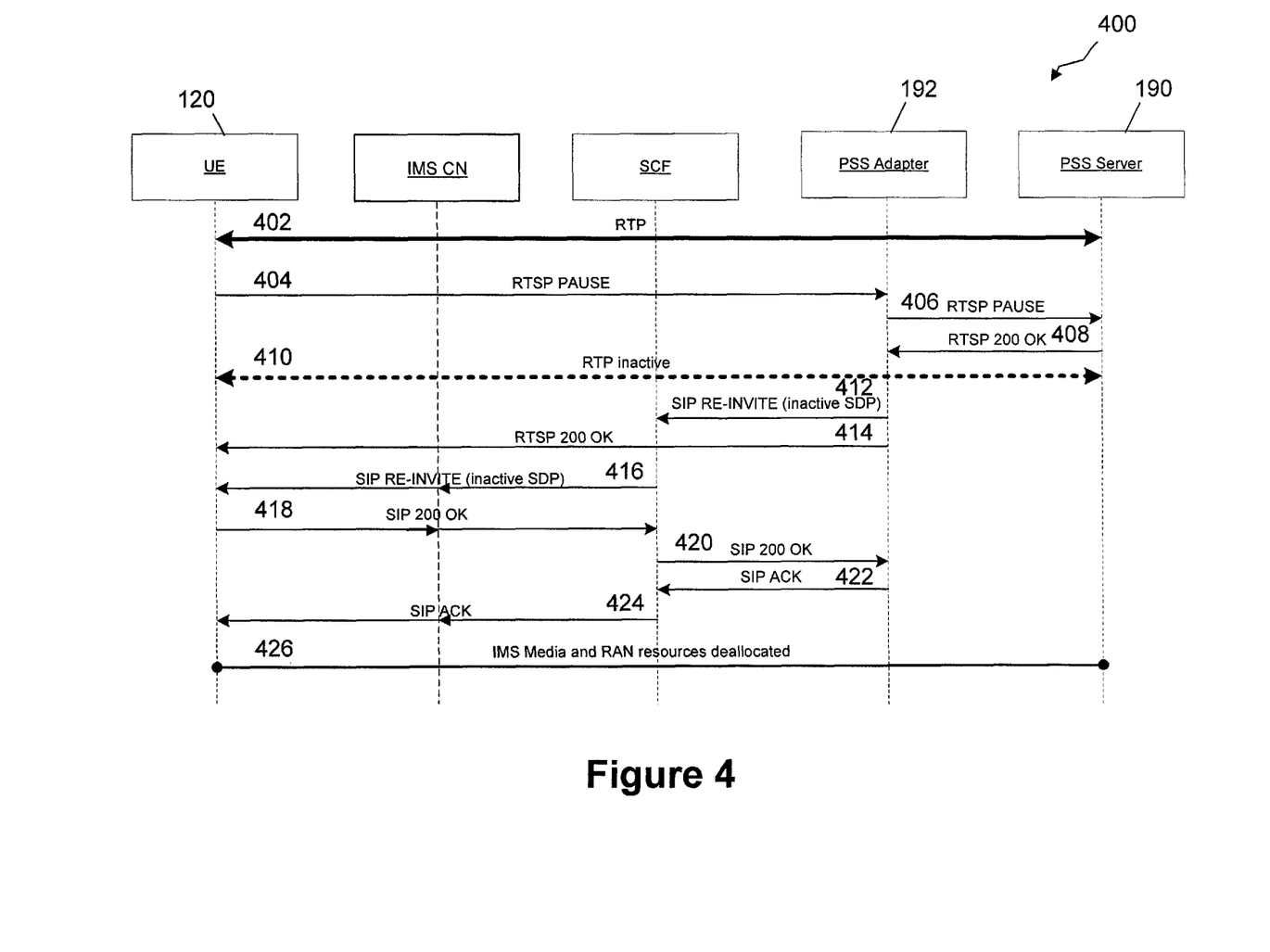
FIG. 4 is a protocol diagram of another method for pausing a media stream and modifying RAN, IP-CAN and IMS resources according to an embodiment of the disclosure.

FIG. 4 illustrates an embodiment of another method 400 for pausing a media stream and modifying the IP-CAN/RAN and IMS resources. Unlike the methods 200 and 300, the SIP RE-INVITE request (or other SIP target refresh requests) may be sent from the signaling/control server 192 such as the PSS Adapter (instead of the UE 120) to the IMS network 160, e.g. after sending the RTSP PAUSE request from the UE 120 to the PSS Adapter. In some cases, the method 400 may be preferable to the methods 200 and 300, since it may require fewer modifications of the UE 120 behavior, according to current standards, to handle media stream playback operations, such as the PAUSE request.

At step 402, the UE 120 may receive a media stream that corresponds to a RTP session with the PSS server (the media server 190). At step 404, the UE 120 may send a RTSP PAUSE request to the PSS adapter. At step 406, the PSS adapter may forward the RTSP PAUSE request to the PSS server, which may then stop the media stream and send a RTSP 200 OK message to the PSS adapter at step 408. Thus, the RTP session may become halted at step 410. At step 412, the PSS adapter may send a SIP RE-INVITE request to the SCF, where the request may be destined for the UE 120. The SIP RE-INVITE request may comprise the inactive SDP information. Subsequently, the PSS adapter may send a RTSP 200 OK message to the UE 120 at step 414 to indicate that the request has been successfully processed. At step 416, the SCF may forward the SIP RE-INVITE request to the UE 120, via the IMS CN, to complete the media stream suspend process.

In another embodiment, the PSS adapter may forward the SIP RE-INVITE request after the PSS adapter sends the RTSP 200 OK message to the UE 120. In some embodiments, the PSS adapter may use an application timer to allow a time delay between receiving the RTSP 200 OK message from the PSS server and sending the SIP RE-INVITE request to the UE 120. When the IMS network 160 processes the SIP RE-INVITE request on its way to the UE 120, it may deallocate the IMS media resources and modify the IP-CAN/RAN resources.

At step 418, the UE 120 may process the SIP RE-INVITE request and send back a SIP 200 OK message to the SCF, via the IMS CN. At step 420, the SCF may forward the SIP 200 OK message to the PSS adapter. The PSS adapter may send a SIP ACK to the SCF at step 422 and the SCF may forward the SIP ACK to the UE 120 (via the IMS CN) at step 424. At step 426, the IMS media and IP-CAN/RAN resources may become de-allocated for the RTP session, e.g. while the media stream is paused.

Figure 5:
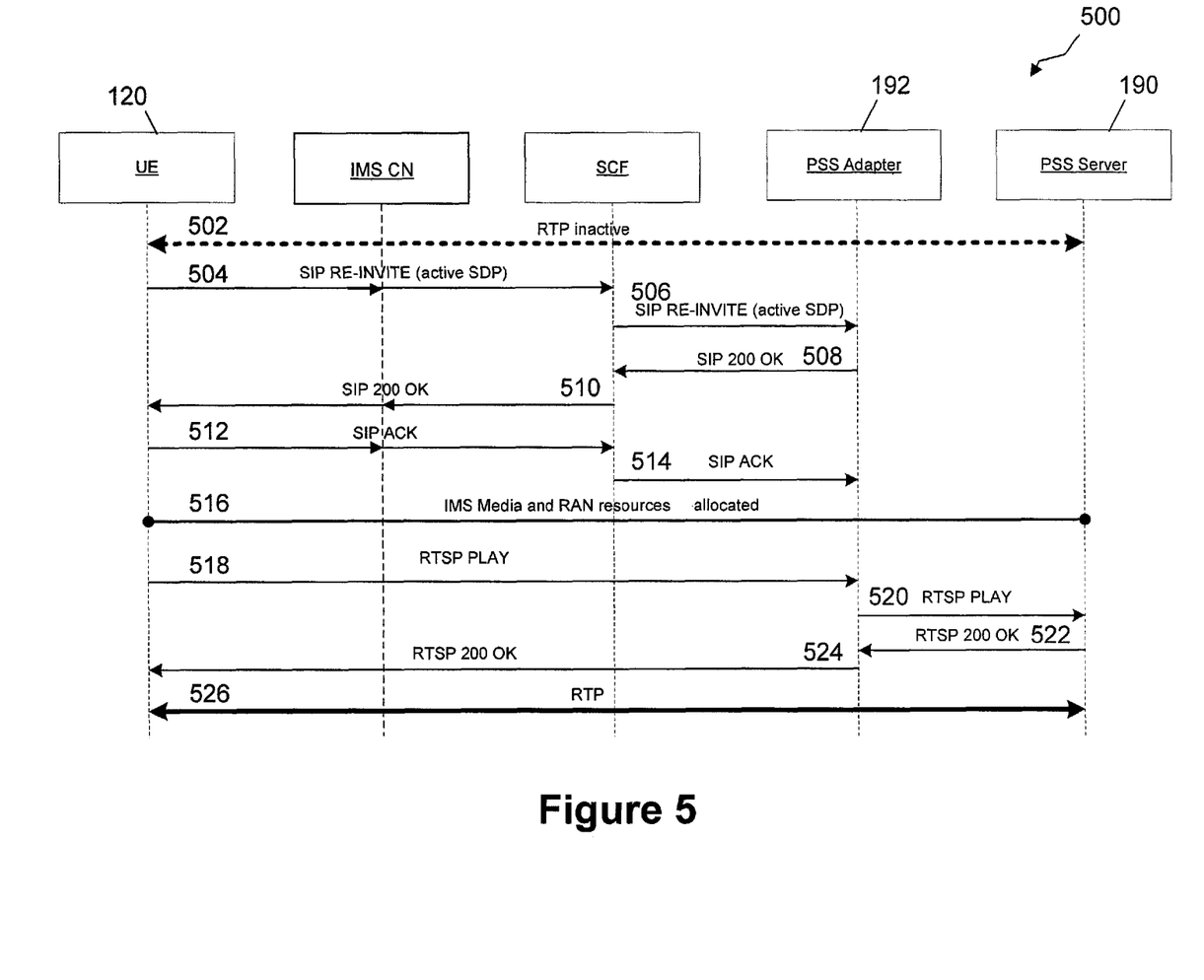
FIG. 5 is a protocol diagram of a method for resuming a paused media stream according to an embodiment of the disclosure.

FIG. 5 illustrates an embodiment of a method 500 for resuming a paused media stream, which may have been previously paused using methods such as those described above. According to the method 500, the UE 120 may send a SIP RE-INVITE request (or other SIP target refresh requests) to the IMS network 160 to re-allocate the IP-CAN/RAN and IMS media resources to the media stream session. At step 502, the RTP session that corresponds to the paused media stream may be inactive. At step 504, the UE 120 may send a SIP RE-INVITE request to the SCF of the IMS network 160, via the IMS CN, e.g. to request the re-allocation of resources. The SIP RE-INVITE request may comprise an SDP body that includes an "a" attribute that has an active attribute value. For example, the SDP body may comprise a=recvonly, a=sendrecv, or a=sendonly. At step 506, the SCF may forward the SIP RE-INVITE request to the PSS adapter. After processing the SIP RE-INVITE request, the PSS adapter may send a SIP 200 OK message to the SCF at step 508 to confirm receiving the request.

At step 510, the SCF may send a SIP 200 OK message to the UE 120, via the IMS CN. In return, the UE 120 may send a SIP ACK to the SCF at step 512 (via the IMS CN), which may then be forwarded to the PSS adapter at step 514. At step 516, the IMS media and IP-CAN/RAN resources, which may have been previously de-allocated, may become re-allocated to the UE 120 to allow resuming the media stream. At step 518, the UE 120 may then send a RTSP PLAY request to the PSS adapter to resume the media stream. At step 520, the PSS adapter may forward the request to the PSS server, which may process the request and reply to the PSS adapter with a RTSP 200 OK message at step 522. At step 524, the PSS adapter may forward the RTSP 200 OK message to the UE 120, and at step 526, the RTP session between the UE 120 and the PSS adapter may be resumed.

Figure 6:
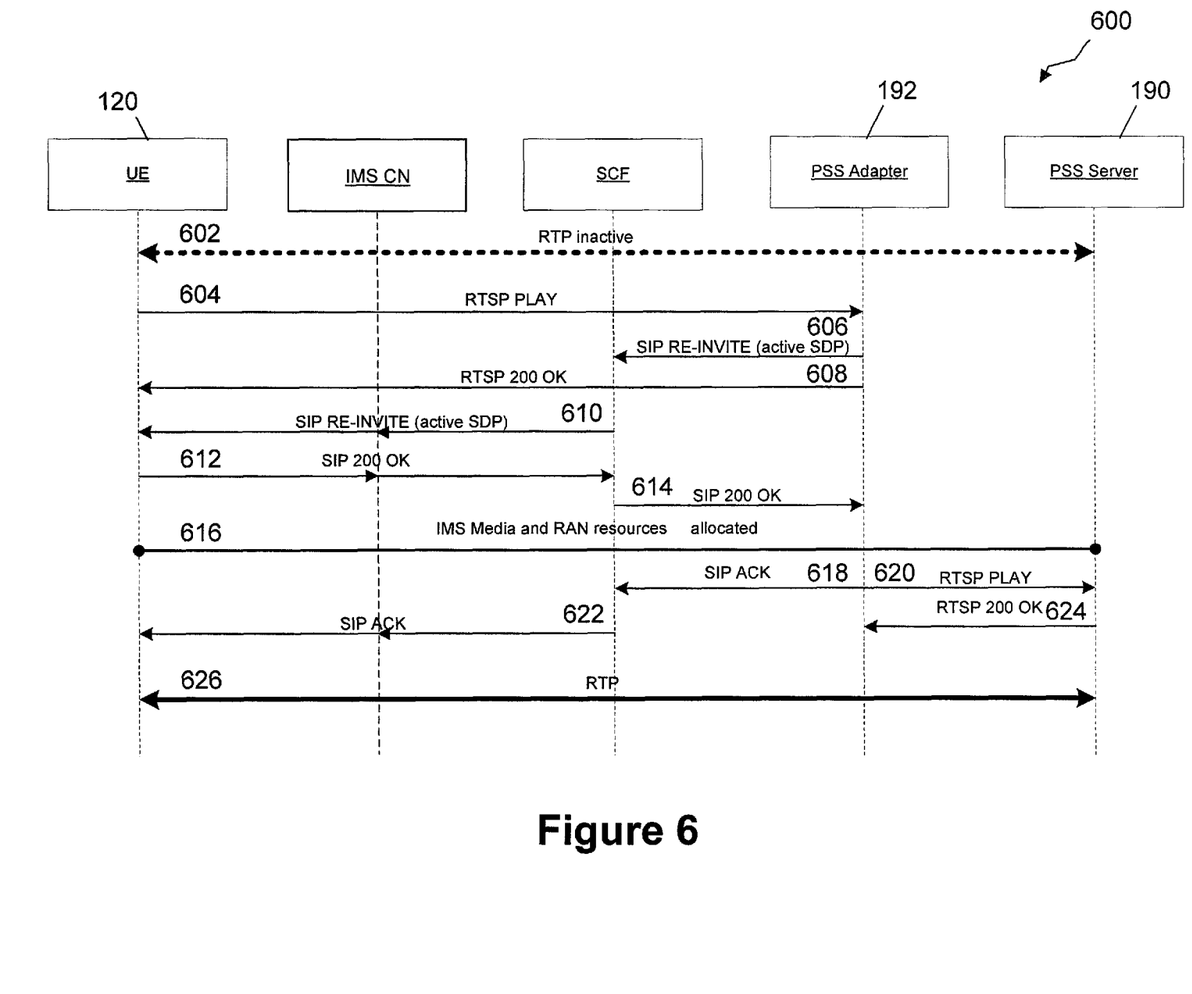
FIG. 6 is a protocol diagram of another method for resuming a paused media stream according to an embodiment of the disclosure.

FIG. 6 illustrates another embodiment of a method 600 for resuming a paused media stream. According to the method 600, the PSS adapter may send the SIP RE-INVITE request to the IMS network 160 at about the same time or after the UE 120 sends the RTSP PLAY request. At step 602, the RTP session that corresponds to the paused media stream may be inactive. At step 604, the UE 120 may send a RTSP PLAY request to the PSS adapter to resume the media stream. At step 606, the PSS adapter may send a SIP RE-INVITE request to the SCF of the IMS network 160 to request the re-allocation of resources. The SIP RE-INVITE is triggered by the RTSP PLAY request. Subsequently, the PSS adapter may send a RTSP 200 OK message to the UE 120 at step 608. Alternatively, the RTSP 200 OK message may be sent to the UE 120 after the SIP RE-INVITE transaction described below is completed. The SCF may forward the SIP RE-INVITE request to the UE 120 (via the IMS CN) at step 610.

At step 612, the UE 120 may send a SIP 200 OK message to the SCF (via the IMS CN), which may be forwarded to the PSS adapter at step 614. At step 616, the IMS media and IP-CAN/RAN resources may become re-allocated to the UE 120 to allow resuming the media stream. Next, the PSS adapter may send a SIP ACK to the SCF at step 618 and a RTSP PLAY request to the PSS server at step 620. The SCF may then forward the SIP ACK to the UE 120 at step 622 (via the IMS CN), and the PSS server may process the request and send a RTSP 200 OK message to the PSS adapter at step 624. The PSS adapter may send the RTSP 200 OK to the UE 120 if it has not done previously (e.g. at step 608). Thus, at step 626, the RTP session between the UE 120 and the PSS server may be resumed.

Figure 7:
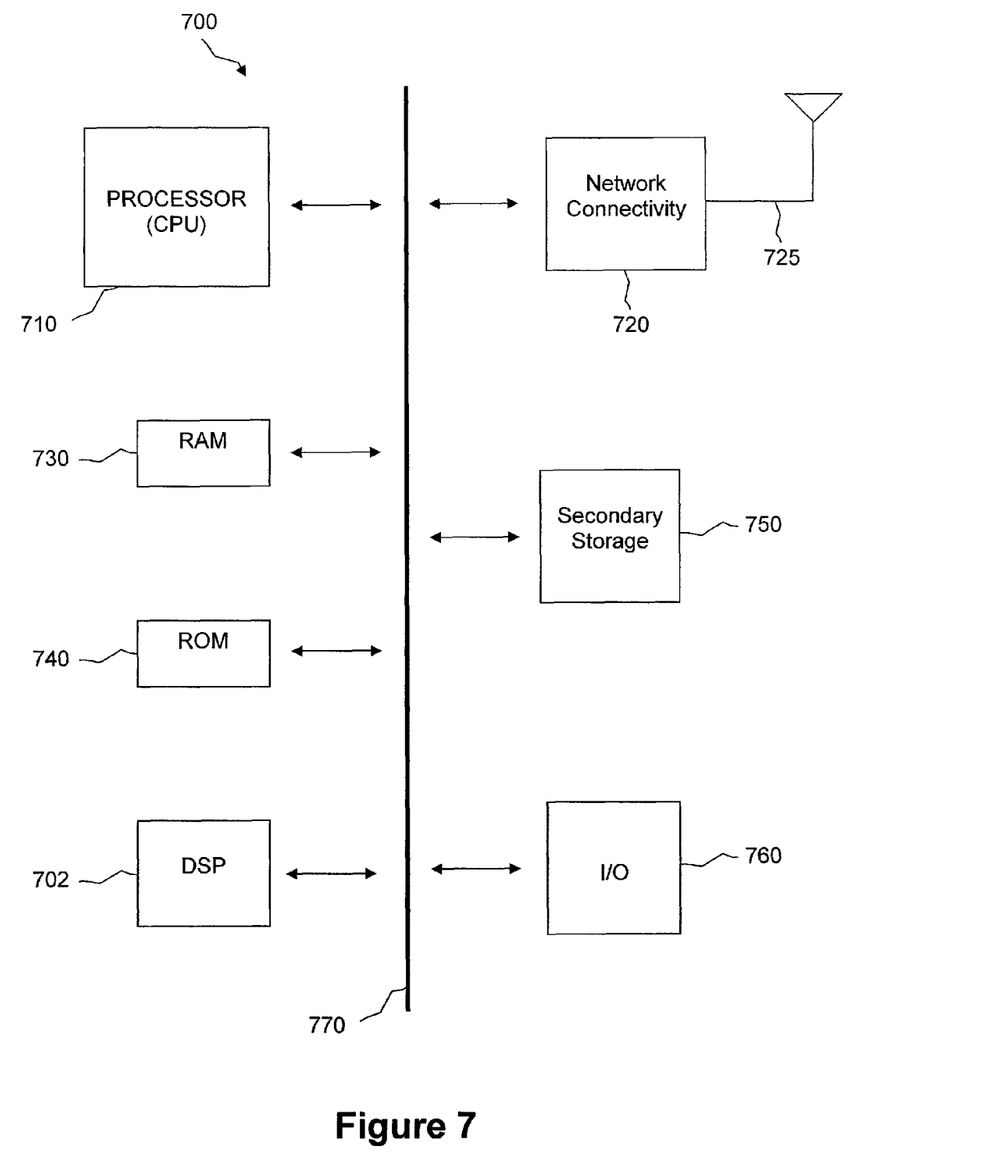
FIG. 7 illustrates a processor and related components suitable for implementing the several embodiments of the present disclosure.

The UE 120 and other components described above might include a processing component that is capable of executing instructions related to the actions described above. FIG. 7 illustrates an example of a system 700 that includes a processing component 710 suitable for implementing one or more embodiments disclosed herein. In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 702. Although the DSP 502 is shown as a separate component, the DSP 502 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 725 might be considered to be a component of the I/O devices 760 instead of or in addition to being a component of the network connectivity devices 720.

Various combinations of the components of the system 700, including memory, hardware, firmware, software or others may be referred to herein as a "component".

The following are incorporated herein by reference for all purposes: 3GPP TS26.234, TS26.237, TS23.203, TS23.228, TS29.162, TS29.235, and TS29.213.

In an embodiment a UE is provided. The UE comprising at least one component configured to support controlling a media stream and modifying IP-CAN/RAN and IMS media resources, wherein the IP-CAN/RAN and IMS media resources are modified using a SIP RE-INVITE request to an IMS network, and wherein the media stream is controlled using a RTSP request to a media server.

In another embodiment, a UE is provided, a UE comprising at least one component configured to support a method comprising sending a RTSP request to a signaling/control server in communications with a media server to control a media stream, wherein a SIP RE-INVITE request associated with the RTSP request is further sent from the UE or the signaling/control server to an IMS network to modify media resources associated with the media stream.

In another embodiment, a signaling/control server is provided, comprising at least one component configured to support controlling a media stream and modifying IP-CAN/RAN and IMS media resources, wherein the media stream is controlled using a RTSP request, and wherein the IP-CAN/RAN and IMS media resources are modified using a SIP RE-INVITE request to an IMS network.

In another embodiment, a signaling/control server is provided, comprising at least one component configured to support a method comprising receiving a RTSP request or a SIP RE-INVITE request from a UE to control a media stream, wherein the SIP RE-INVITE request is further sent to the UE via an IMS network to modify media resources associated with the media stream.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a memory;
at least one component configured to support controlling a media stream and modifying Internet Protocol-Connectivity Access Network (IP-CAN)/Radio Access Network (RAN) and Internet Protocol (IP) Multimedia Subsystem (IMS) media resources, the at least one component comprising a processor, the processor being configured to:
send a Session Initiation Protocol (SIP) RE-INVITE to an IMS network, the SIP RE-INVITE modifying the IP-CAN/RAN and IMS media resources associated with the media stream, and
send a Real Time Streaming Protocol (RTSP) request to a media server, the RTSP request comprising a command to control the media stream,
wherein the processor is further configured to set a time delay between sending the RTSP request controlling the media stream and sending the SIP RE-INVITE request modifying the IMS media resources associated with the media stream based on a timer.

2. The UE of claim 1, wherein the processor is further configured to send the SIP-REINVITE request subsequent to the RTSP request.

3. The UE of claim 1 wherein the processor is further configured to send the RTSP request subsequent to the SIP RE-INVITE request.

4. The UE of claim 1, wherein the RTSP request is a RTSP PAUSE request, wherein the SIP RE-INVITE request comprises a Session Description Protocol (SDP) body which includes an "a" attribute that is set to "inactive", "sendonly", or "recvonly" to stop the media stream, and wherein the SIP RE-INVITE request causes the IMS network to de-allocate IP-CAN/RAN and IMS media resources that are associated with the media stream.

5. The UE of claim 1, wherein the RTSP request is a RTSP PLAY request, wherein the SIP RE-INVITE request comprises a Session Description Protocol (SDP) body which includes an "a" attribute that is set to "recvonly", "sendrecv", or "sendonly" to resume the media stream, and wherein the SIP RE-INVITE request causes the IMS network to re-allocate IP-CAN/RAN and IMS media resources that are associated with the media stream.

6. The UE of claim 1, wherein an IMS Core Network (IMS CN) forwards SIP messages from and/or to the UE.

7. A user equipment (UE), comprising:
a memory;
at least one component, the at least one component comprising a processor configured to support a method comprising:
sending a Real Time Streaming Protocol (RTSP) request to a signaling/control server in communications with a media server, the RTSP request comprising a command to control a media stream,
sending a Session Initiation Protocol (SIP) RE-INVITE request associated with the RTSP request to an Internet Packet (IP) Multimedia Subsystem (IMS) network, the SIP-REINVITE request modifying resources associated with the media stream,
wherein the processor is further configured to send the SIP RE-INVITE to the IMS network before or at about the same time of sending the RTSP request to the signaling/control server, and wherein the processor is further configured to set a time delay between sending the RTSP request controlling the media stream and sending the SIP RE-INVITE request modifying the IMS media resources associated with the media stream based on a timer.

8. The UE of claim 7, wherein the processor is further configured to send the SIP RE-INVITE request to the IMS network after sending the RTSP request to the PSS signaling/control server.

9. The UE of claim 7, wherein the RTSP request is a PAUSE request that requests the media server to stop the media stream, and wherein the SIP RE-INVITE request comprises attributes to de-allocate IP-Connectivity Access Network (IP-CAN)/Radio Access Network (RAN) and IMS media resources associated with the media stream.

10. The UE of claim 7, wherein the RTSP request is a PLAY request that requests the media server to resume the media stream, and wherein the SIP RE-INVITE request comprises attributes to re-allocate IP-Connectivity Access Network (IP-CAN)/Radio Access Network (RAN) and IMS media resources associated with the media stream.

11. A signaling/control server, comprising:
a memory;
at least one component configured to support controlling a media stream and modifying Internet Protocol-Connectivity Access Network (IP-CAN)/Radio Access Network (RAN) and Internet Packet (IP) Multimedia Subsystem (IMS) media resources, the at least one component comprising a processor, the processor being configured to:
receive the RTSP request from a user equipment (UE), the RTSP request comprising a command to control the media stream, and
send the SIP RE-INVITE request to the IMS network in response to receiving the RTSP request, the SIP RE-INVITE modifying the IP-CAN/RAN and IMS media resources associated with the media stream, and
wherein the signaling/control server is a Packet Switch Streaming (PSS) adapter, an IP Television (IPTV) call control server, or a Session Control Function (SCF).

12. A signaling/control server, comprising:
a memory;
at least one component, the at least one component comprising a processor, the processor being configured to support a method comprising:
receiving a Real Time Streaming Protocol (RTSP) request from a user equipment (UE) to control a media stream, the RTSP request comprising a command to control the media stream,
sending a SIP RE-INVITE request to the UE via an Internet Packet (IP) Multimedia Subsystem (IMS) network, the SIP RE-INVITE modifying the IP-CAN/RAN and IMS media resources associated with the media stream, and
wherein the signaling/control server is a Packet Switch Streaming (PSS) adapter, an IP Television (IPTV) call control server, or a Session Control Function (SCF).

13. The signaling/control server of claim 12, wherein the media stream corresponds to a Packet Switch Streaming (PSS), a Multimedia Broadcast/Multicast Service (MBMS), or an IP Television (IPTV) session.

* * * * *